No. 886,778. PATENTED MAY 5, 1908.
R. H. DUNLAP.
POWER TRANSMITTING MECHANISM.
APPLICATION FILED DEC. 13, 1907.

Witnesses
Stuart Hilder.
George M. Anderson.

Inventor
Robert H. Dunlap
by E. W. Anderson
his Attorney

UNITED STATES PATENT OFFICE.

ROBERT HENRY DUNLAP, OF THE UNITED STATES MARINE CORPS.

POWER-TRANSMITTING MECHANISM.

No. 886,778.  Specification of Letters Patent.  Patented May 5, 1908.

Application filed December 13, 1907. Serial No. 406,265.

*To all whom it may concern:*

Be it known that I, ROBERT HENRY DUNLAP, a citizen of the United States, captain United States Marine Corps, have made a certain new and useful Invention in Power-Transmitting Mechanism; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
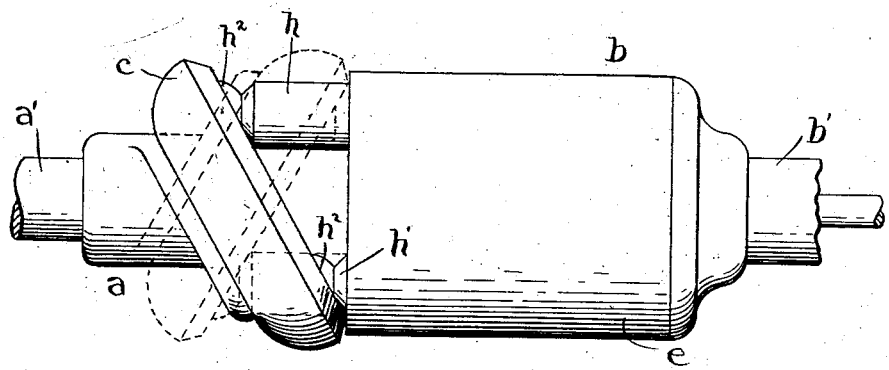
Figure 2:
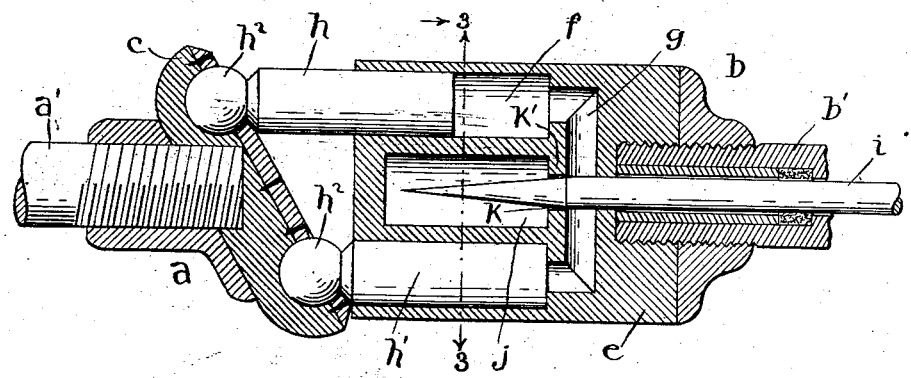
Figure 3:
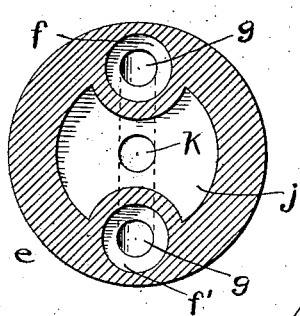
Figure 5:
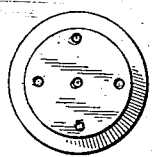
Figure 4:
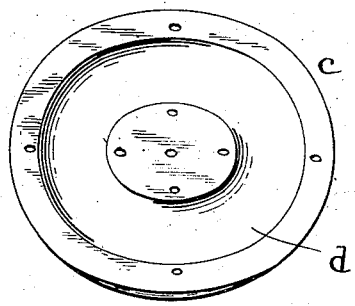
Figure 6:
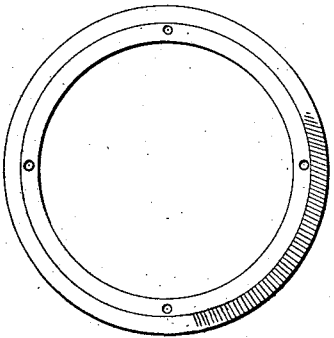

Figure 1 is a side view of the invention the position of the cam wheel turned one half around being shown in dotted lines. Fig. 2 is a central longitudinal section of the invention with the parts thereof in the positions shown in Fig. 1. Fig. 3 is a section on the line 3—3, Fig. 2. Fig. 4 is a detail face view of the wheel having the cam track or groove. Fig. 5 is a detail view of the inner member of the cover or face plate. Fig. 6 is a similar view of the outer member of such plate.

The invention relates to power transmitting mechanism having for its object the provision of improved means whereby the power transmission will be gradual and without shock or jar, and whereby any desired variation or degree of speed up to the full speed of the driving member may be reached, all in a practical and simple manner.

Other objects and advantages will hereinafter appear.

In the accompanying drawings, illustrating the invention, the letter $a$, designates the driving member having a shaft $a'$, and $b$, is the driven member having a shaft $b'$, in line with the shaft of the driving member, the ends of such shafts having an opposing relation to each other. Upon the end of the shaft $a'$, is secured to turn therewith a wheel $c$, arranged as shown at an angle of sixty degrees to the shaft and having in its inner face an annular cam track or groove $d$, of concave character, the transverse elements of such groove being semi-circular. Upon the end of the shaft $b'$, is secured in a fast manner to turn therewith a cylindrical head $e$, having at diametrically opposite points cylinder chambers $f$, and $f'$, formed therein, the outer ends of such chambers being open and the inner ends thereof being connected by a transverse port or passageway $g$.

Fitting in the cylinder chambers $f$, and $f'$, are pistons $h$, and $h'$, having globular or ball-form heads $h^2$, which are seated in the annular cam track or groove $d$, at diametrically opposite points thereof, a cover or face plate composed of an annular outer member and a circular inner member being used to prevent escape of the ball heads of the pistons from the cam track or runway, the members of such plate having the opposing edges thereof suitably formed to closely engage a narrow zone of the ball heads. The port or passageway $g$, and the unoccupied portion or portions of the cylinder chambers is completely filled with a suitable liquid such as glycerin or oil, a needle valve $i$, fitting centrally within the shaft $b'$, which is bored out for this purpose, being employed to control the passage of the liquid aforesaid from one half of the passageway to the other. The face of the wheel $c$, at one side thereof is arranged closely adjacent to the head $e$, and the pistons or plungers have such length that at one point in the reciprocation of each the cylinder is completely occupied thereby, when the opposite piston will occupy about one half of its cylinder.

Upon rotation of the driving member $a$, the wheel $c$, turning therewith will, if the port $g$, be entirely open, freely reciprocate the plungers in the cylinders, the ball heads of the plungers sliding in the cam groove or runway and the driven member remaining at rest. Should the valve in the port be entirely closed the pistons will not reciprocate at all and the driven member will rotate at the full speed of the driving member. Between the position of rest of the driven member and the full speed thereof, any desired degree or variation of speed may be reached by adjustment of the valve $i$, in the port $g$, which will be accompanied by more or less sliding of the ball heads of the pistons in the cam groove and a more or less rapid reciprocation of the pistons in the cylinders—all without shock or jar in making such changes—which will take place gradually.

A central oil reservoir $j$, is arranged in the head $e$, such reservoir communicating with the port $g$, at the central portion thereof by an opening $k$, in the wall $k'$, between reservoir and port, this opening being in line with the needle valve, which enters this opening and also the reservoir.

Having described the invention, what I claim and desire to secure by Letters Patent is:

1. A driving element, a driven element, said elements having respectively a pair of parallel pistons and parallel oppositely arranged cylinders engaged thereby the front and rear ends of said cylinders being located at the corresponding ends of the element in which they are located, said cylinders having a connecting passage to form a confining space for liquid, said driving element being adapted to cause opposite reciprocation of the pistons in the cylinders, and a valve in said passage.

2. A driving element including an inclined wheel having an annular cam track, and a pair of parallel pistons having heads engaging said track, a driven element having cylinders engaged by said pistons, said cylinders having a connecting passage to form a confining space for liquids, and a valve in said passage.

3. A driving shaft having a wheel thereupon provided with an annular track inclined to the axis of said shaft, and parallel pistons having heads engaging said track, a driven shaft having a head provided with cylinders engaged by said pistons, and a passageway connecting said cylinders, and a valve in said passageway.

4. A driving shaft having an inclined wheel provided with an annular inclosed track, and parallel pistons having heads engaging said track, a driven shaft having a head provided with cylinders engaged by said pistons, a passageway connecting said cylinders, and an oil reservoir having connection with said passageway, and a valve in said passageway.

5. A driving element, a driven element, said elements having respectively parallel pistons and parallel oppositely arranged cylinders engaged thereby the front and rear ends of said cylinders being located at the corresponding ends of the element in which they are arranged, said cylinders having a connecting passageway to form a confining space for liquid, said driving element being adapted to cause opposite reciprocation of said pistons, and a valve in said passageway.

In testimony whereof I affix my signature, in presence of two witnesses.

ROBERT HENRY DUNLAP.

Witnesses:
GEORGE M. ANDERSON,
HERBERT C. EMERY.